(12) United States Patent
Kawakubo

(10) Patent No.: US 11,178,302 B2
(45) Date of Patent: Nov. 16, 2021

(54) IMAGE FORMING APPARATUS AND IMAGE READING DEVICE THAT STOPS CONVEYANCE OF A SHEET BASED ON A CHANGE AMOUNT OF SKEW ANGLE

(71) Applicant: KYOCERA Document Solutions Inc., Osaka (JP)

(72) Inventor: Yuki Kawakubo, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/923,695

(22) Filed: Jul. 8, 2020

(65) Prior Publication Data

US 2021/0014374 A1 Jan. 14, 2021

(30) Foreign Application Priority Data

Jul. 10, 2019 (JP) .............................. JP2019-128384

(51) Int. Cl.
*H04N 1/46* (2006.01)
*H04N 1/00* (2006.01)

(52) U.S. Cl.
CPC ..... *H04N 1/00718* (2013.01); *H04N 1/00724* (2013.01); *H04N 1/00777* (2013.01)

(58) Field of Classification Search
CPC ........... H04N 1/00718; H04N 1/00724; H04N 1/00777

USPC ......................................................... 358/504
See application file for complete search history.

(56) References Cited

U.S. PATENT DOCUMENTS

| | | | |
|---|---|---|---|
| 6,301,022 B1 | 10/2001 | Washio et al. | |
| 8,342,517 B2* | 1/2013 | Kinoshita | B65H 9/002 271/228 |
| 2010/0110506 A1* | 5/2010 | Katou | H04N 1/00694 358/488 |
| 2011/0075168 A1* | 3/2011 | Ikari | H04N 1/3878 358/1.9 |
| 2014/0210152 A1* | 7/2014 | Kakuta | B65H 5/062 271/3.16 |
| 2015/0207941 A1* | 7/2015 | Koda | H04N 1/00702 358/3.26 |
| 2019/0315586 A1* | 10/2019 | Yamane | B65H 7/14 |

FOREIGN PATENT DOCUMENTS

JP H10-336425 A 12/1998

* cited by examiner

*Primary Examiner* — Gabriel I Garcia
(74) *Attorney, Agent, or Firm* — Studebaker & Brackett PC

(57) ABSTRACT

An image forming apparatus includes a first detector, a second detector, and a determination section. The first detect detects a first skew angle of a sheet. The second detector is located downstream of the first detector and detects a second skew angle of the sheet. The determination section determines whether or not to stop conveyance of the sheet based on the first skew angle and the second skew angle.

16 Claims, 11 Drawing Sheets

IMAGE FORMING APPARATUS AND IMAGE READING DEVICE THAT STOPS CONVEYANCE OF A SHEET BASED ON A CHANGE AMOUNT OF SKEW ANGLE

INCORPORATION BY REFERENCE

The present application claims priority under 35 U.S.C. § 119 to Japanese Patent Application No. 2019-128384, filed on Jul. 10, 2019. The contents of this application are incorporated herein by reference in their entirety.

BACKGROUND

The present disclosure relates to an image forming apparatus and an image reading device.

An image forming apparatus such as a multifunction peripheral employing electrography is provided with a sheet conveyor device such as an auto document feeder in order to convey documents, sheets (paper), or the like.

A document or the like may be conveyed in a direction inclined relative to a conveyance direction in which it is to be conveyed, due to a malfunction of an image reading device or the like. The inclination of the document or the like relative to the conveyance direction will hereinafter be referred to as a "skew". It therefore has been considered to detect skew of a document or the like and correct image data generated by reading the document.

SUMMARY

An image forming apparatus according to an aspect of the present disclosure includes a conveyance section, a first detector, a second detector, and a determination section. The conveyance section conveys a sheet along a conveyance path. The first detector detects a first skew angle of the sheet conveyed by the conveyance section. The second detector is located downstream of the first detector in the conveyance path and detects a second skew angle of the sheet. The determination section determines whether or not to stop conveyance of the sheet based on the first skew angle and the second skew angle.

An image reading device according to an aspect of the present disclosure includes a conveyance section, a first detector, a second detector, and a determination section. The conveyance section conveys a sheet along a conveyance path. The first detector detects a first skew angle of the sheet conveyed by the conveyance section. The second detector is located downstream of the first detector in the conveyance path and detects a second skew angle of the sheet. The determination section determines whether or not to stop conveyance of the sheet based on the first skew angle and the second skew angle.

DETAILED DESCRIPTION

Figure 1:
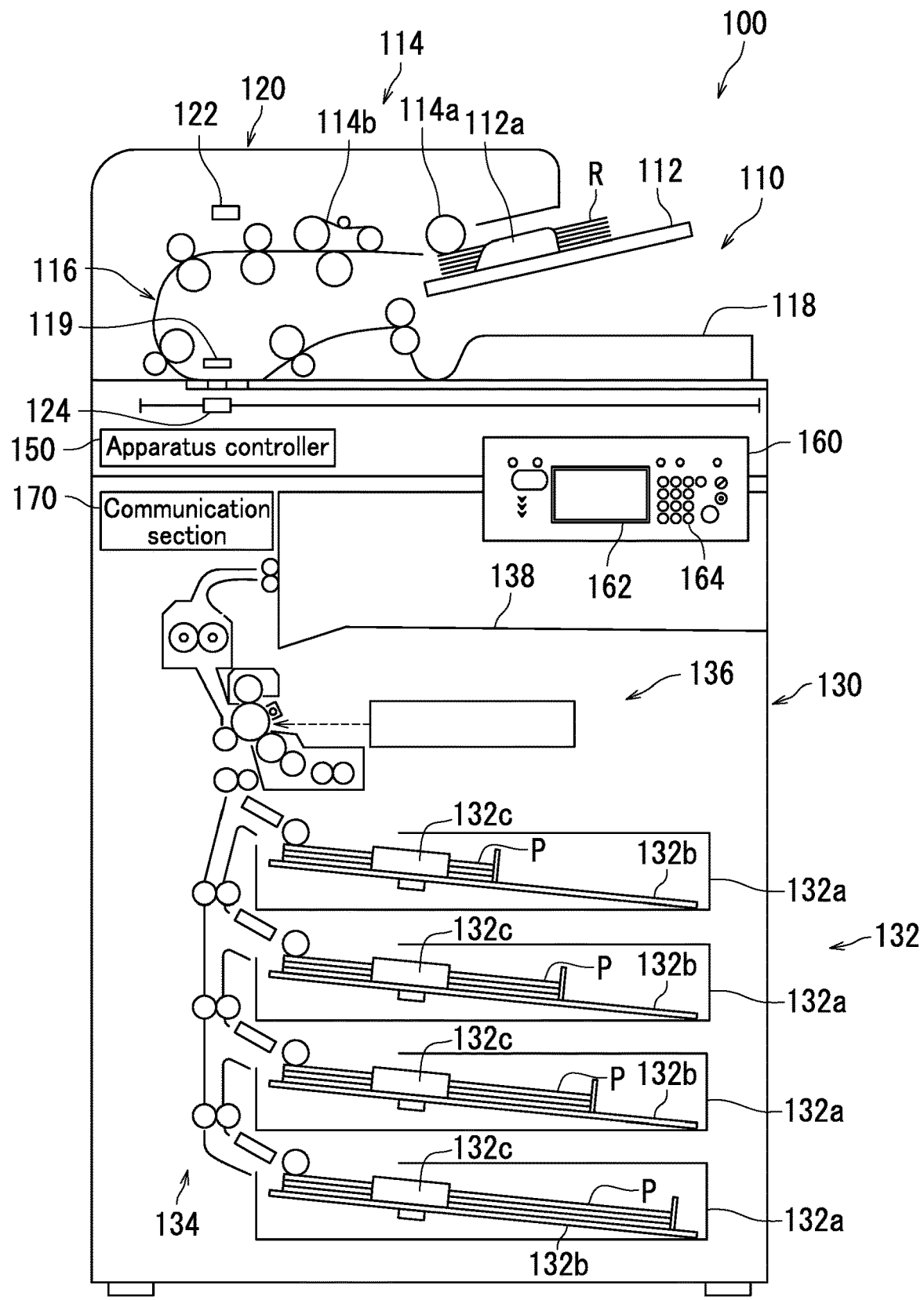
FIG. 1 is a schematic illustration of an image forming apparatus according to an embodiment.

An embodiment of the present disclosure will hereinafter be described with the accompanying drawings. Elements that are the same or equivalent are labelled with the same reference signs in the drawings and description thereof is not repeated.

Figure 2:
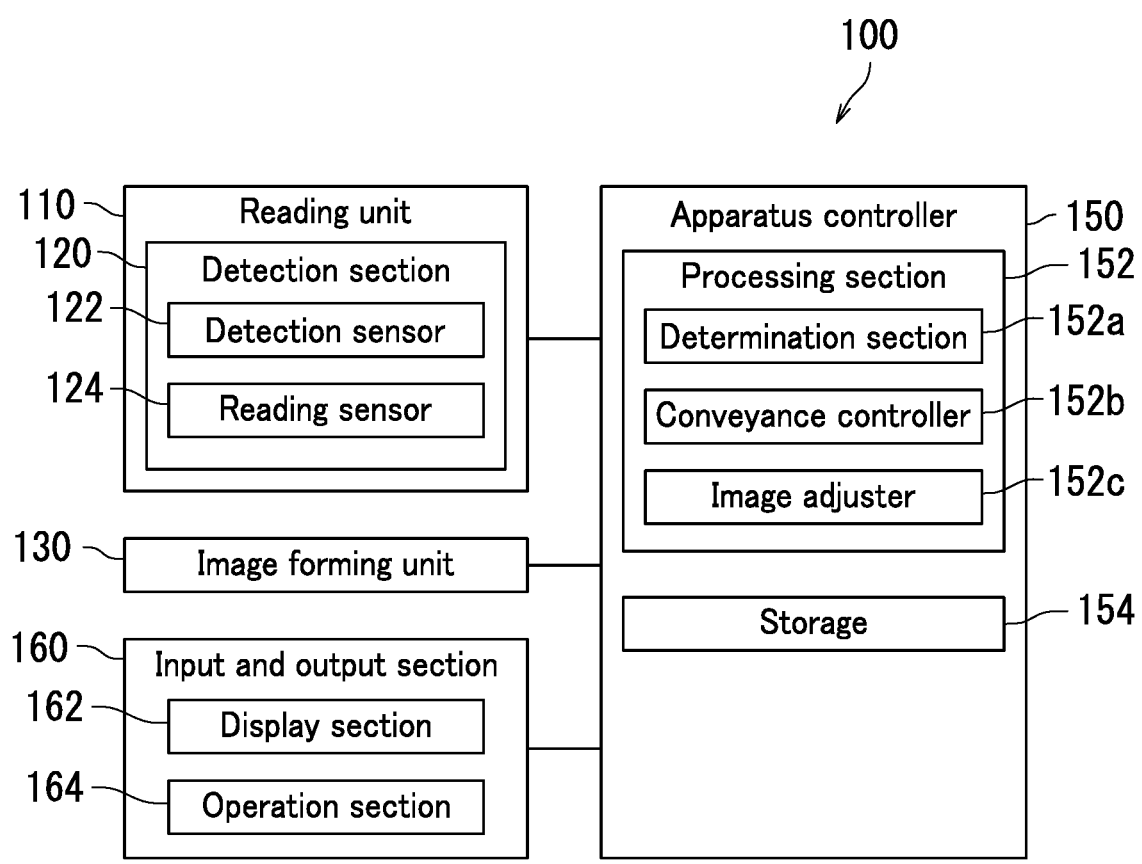
FIG. 2 is a block diagram of the image forming apparatus according to the present embodiment.

A structure of an image forming apparatus 100 according to the present embodiment will first be described with reference to FIGS. 1 to 3. FIG. 1 is a schematic illustration of the image forming apparatus 100. The image forming apparatus 100 according to the present embodiment is an electrographic multifunction peripheral.

As illustrated in FIG. 1, the image forming apparatus 100 includes a reading unit 110, an image forming unit 130, an apparatus controller 150, an input and output section 160, and a communication section 170.

The reading unit 110 reads an image of a document R (the image obtained by scanning a sheet of paper that is the document R and has the image may also be referred to as a "read image") to generate image data representing the read image. Typically, the document R is thin and rectangular. Examples of the document R include a sheet of plain paper, a sheet of recycled paper, a sheet of thin paper, a sheet of thick paper, a sheet of coated paper, and an overhead projector (OHP) sheet.

The reading unit 110 conveys documents R one at a time. The reading unit 110 includes an auto document feeder (ADF). The reading unit 110 performs conveyance control of each document R or corrects image data of each document R based on skew angles of a corresponding document R.

The image forming unit 130 forms an image on a sheet of paper P. For examples, the image forming unit 130 forms an image on the sheet of the paper P based on the image data representing the read image. Each sheet of paper P and each document R correspond to an example of a "sheet".

The apparatus controller 150 controls an operation of each constituent part of the image forming apparatus 100 based on a control program. The apparatus controller 150 will be described later with respect to FIG. 2.

The input and output section 160 display information on a display screen thereof and allows a user to enter an instruction therethrough. The input and output section 160 includes a display section 162 and an operation section 164.

The display section 162 displays various information. The display section 162 includes a liquid-crystal display.

The operation section 164 includes a start button, arrow buttons, and a numeric keypad. The start button is a button that causes the image forming apparatus 100 to perform different functions (processes). Each arrow button is a button for changing a selection target. The numeric keypad includes buttons (keys) that allow the user to enter a numerical value therethrough. The operation section 164 may include a touch panel.

The communication section 170 is communicatively connected to a different electronic device(s) via an unillustrated network. Examples of the network include the Internet, a local area network (LAN), and a wide area network (WAN).

The reading unit 110 includes a table 112, a feeding section 114, a conveyance section 116, an ejection section 118, and a detection section 120. The detection section 120 includes a detection sensor 122 and a reading sensor 124.

The table 112 allows one or more documents R to be placed thereon. Regulating sections 112a are placed upright on the table 112. Specifically, the regulating sections 112 are guide plates placed upright on the table 112. The regulating sections 112 prevent a skew from occurring in a document R fed toward the conveyance section 116.

The feeding section 114 feeds the documents R one at a time. That is, the feeding section 114 feeds the documents R placed on the table 112 one at a time. The feeding section 114 includes feeding rollers. The feeding rollers are controlled by the apparatus controller 150. In the present embodiment, the feeding section 114 includes a first feeding section 114a and a second feeding section 114b. Note that the feeding section 114 may include a belt such as a caterpillar track (trademark).

The conveyance section 116 conveys a document R fed from the feeding section 114 to the ejection section 118 along the conveyance path. The conveyance section 116 includes conveyance rollers. The conveyance rollers convey the document R. Typically, the conveyance section 116 includes conveyance roller pairs. The conveyance roller pairs are rotated, thereby conveying the document R. The conveyance rollers are controlled by the apparatus controller 150. The conveyance section 116 conveys the document R to the ejection section 118 via the detection sensor 122 and the reading sensor 124. The ejection section 118 allows the document R conveyed by the conveyance section 116 to be placed thereon.

The detection sensor 122 detects the presence of the document R while the document R is being conveyed by the conveyance section 116. In addition, the reading sensor 124 reads an image of the document R while the document R is being conveyed by the conveyance section 116. A conveyance width is defined in the conveyance section 116 in advance. Here, the conveyance width is a width that allows the documents R to be conveyed in a perpendicular direction to a conveyance direction in which the document R is to be conveyed.

The detection sensor 122 detects the presence of a document R. In addition, the detection sensor 122 detects a skew angle of the document R. In the present specification, when the detection sensor 122 detects the skew angle of the document R, the detected skew angle may be referred to as a "first skew angle". The detection sensor 122 is for example an optical sensor. Note that the detection sensor 122 may be referred to as a "first detector" in the present specification.

Note that the detection sensor 122 may be constituted by an ultrasonic sensor. In the case where the ultrasonic sensor is employed as the detection sensor 122, the detection sensor 122 includes an ultrasonic transmitter and an ultrasonic receiver. The detection sensor 122 causes an ultrasonic signal transmitted from the ultrasonic transmitter to pass through the document R. The ultrasonic receiver receives the ultrasonic signal passing through the document R and detects presence or absence of the document R based on a change in strength of the received ultrasonic signal.

The reading sensor 124 is located downstream of the detection sensor 122 in the conveyance path. The reading sensor 124 reads an image of a front side of the document R and generates image data represent the image of the front side. Further, the reading sensor 124 detects a skew angle of the document R based on the image read by the reading sensor 124.

In the present specification, the reading sensor 124 corresponds to an example of a "second detector". In the case where the skew angle of the document R is detected by the reading sensor 124, the detected skew angle may be referred to as a "second skew angle".

The reading sensor 124 extracts a contour of the document R based on a contrast difference between the image of the document R read by the reading sensor 124 and an image of a plate or the like other than the document R, or on an image of a shadow when the document R is read. The reading sensor 124 detects the skew angle based on the extracted contour. The skew angle is calculated based on for example an inclination of the contour of the image of the document R relative to a center line of the image read by the reading sensor 124.

The reading sensor 124 is a scanner whose type examples include a contact image sensor (CIS) and a charge coupled device CCD. Specifically, the reading sensor 124 is a CIS unit obtained by integrating light emitting diodes (LEDs) as a light source, a contact glass, an imaging lens, and an image sensor. Note that when constituted by the CIS unit, the reading sensor 124 may be constituted so that a light quantity emitted from the light source when the second skew angle is detected differs from a light quantity emitted from the light source when the image of the document R is read. For example, it is preferable that the light quantity emitted from the light source when the second skew angle is detected be larger than the light quantity emitted from the light source when the image of the document R is read.

The image forming unit 130 forms an image on a sheet of paper P. For example, the image forming unit 130 forms the image on the sheet of the paper P based on the image data generated by the reading unit 110. The image forming unit 130 includes a paper feed unit 132, a conveyance section 134, an image forming section 136, and an ejection section 138.

The paper feed unit 132 allows paper P to be loaded thereon for each of stages (in FIG. 1, four stages). The paper feed unit 132 includes a tray 132a, a table 132b, and regulating sections 132c for each stage.

The tray 132a houses the table 132b that allows paper P to be placed thereon. Examples of the paper P include plain paper, recycled paper, thin paper, thick paper, and coated paper.

Regulating sections 132c are placed upright on the table 132b. The regulating sections 132c regulate a skew of the sheet when a sheet of the paper P placed on the table 132b is fed toward the image forming section 136.

The conveyance section 134 conveys the sheet of the paper P to the ejection section 138 via the image forming section 136 along the conveyance path. The conveyance section 134 includes conveyance rollers. Typically, the conveyance section 134 includes conveyance roller pairs. The conveyance roller pairs are rotated, thereby conveying the sheet of the paper P. The conveyance rollers are controlled by the apparatus controller 150. The conveyance section 134 conveys the sheet of the paper P to the ejection section 138 via the image forming section 136. The ejection section 138 allows the sheet of the paper P conveyed by the conveyance section 134 to be placed thereon.

The image forming section 136 forms an image on the sheet of the paper P. The image forming section 136 may transfer an image formed on an unillustrated intermediate transfer belt to the sheet of the paper P. The image forming section 136 then fixes the transferred image to the sheet of the paper P. The ejection section 138 allows the sheet of the paper P having the image fixed thereto be loaded thereon.

Preferably, the reading unit 110 further includes a facing member 119. The facing member 119 is located facing the reading sensor 124. The facing member 119 supports detection of the second skew angle when the reading sensor 124 reads the image of the document R. Specifically, the facing member 119 is a plate that is rectangular and has a high contrast to color of the Document R. The facing member 119 supports detection of the second skew angle when the reading sensor 124 reads the image of the document R. In the present embodiment, color of the facing member 119 is set so that a contrast between the color of the document R and the color of the facing member 119 is higher than a predefined threshold.

The structure of the image forming apparatus 100 will next be described with reference to FIGS. 1 and 2. FIG. 2 is a structural block diagram of the image forming apparatus 100. As described with reference to FIG. 1, the image forming apparatus 100 includes the reading unit 110, the image forming unit 130, the apparatus controller 150, and the input and output section 160. Hereinafter, the apparatus controller 150 will mainly be described in detail.

The apparatus controller 150 includes a processing section 152 and storage 154. The processing section 152 includes for example a processor. Examples of the processor may include a central processing unit (CPU) and an application specific integrated circuit (ASIC). The processing section 152 executes the control program stored in the storage 154, thereby controlling an operation of each constituent part of the image forming apparatus 100.

The storage 154 stores therein various data on control of the image forming apparatus 100 and the control program. Examples of the storage 154 include read-only memory (ROM), random-access memory (RAM), and a solid-state drive (SSD). The storage 154 may include external memory. The external memory is a removable medium. Examples of the external memory in the storage 154 may further include universal serial bus (USB) memory and a secure digital (SD) card.

The processing section 152 includes a determination section 152a, a conveyance controller 152b, and an image adjuster 152c. In the present embodiment, when the control program stored in the storage 154 is executed by the processing section 152, instructions of the control program cause the processing section 152 to carry out respective functions of the determination section 152a, the conveyance controller 152b and the image adjuster 152c.

The determination section 152a determines whether or not the document R skews based on the skew angles of the document R. In addition, the determination section 152a predicts a path of the document R based on the skew angles of the document R.

The determination section 152a determines whether or not to stop conveyance of the document R based on at least the first and second skew angles. Here, the first skew angle is detected by the detection sensor 122, while the second skew angle is detected by the reading sensor 124. For example, when at least one of the first and second skew angles is larger than a prescribed threshold, the determination section 152a determines to stop conveyance of the document R.

Further, the determination section 152a may determine whether or not to stop conveyance of the document R based on a change amount of the second skew angle relative to the first skew angle. Specifically, the determination section 152a may determine to stop conveyance of the document R when a difference between the first and second skew angles is larger than the prescribed threshold. In addition, the determination section 152a determines to stop conveyance of the document R when it is predicted that the document R will deviate from the conveyance width of the conveyance section 116 due to conveyance of the document R.

The conveyance controller 152b controls respective operations of the feeding section 114 and the conveyance section 116 according to an instruction of the processing section 152. The conveyance controller 152b controls for example a stepper motor that drives the rollers and the like of the feeding section 114 and the conveyance section 116 based on control pulses transmitted from the processing section 152.

The image adjuster 152c corrects the image data generated from the image of the document R according to an instruction of the processing section 152. Specifically, the image adjuster 152c corrects the image data such that an image (skewed image) read from a skewed document R is adjusted to be an image not skewed (horizontal image). Note that the image adjuster 152c corresponds to one example of an "adjuster".

The processing section 152 executes the control program stored in the storage 154, thereby controlling an operation of each constitute part of the image forming apparatus 100.

Detection of a skew angle of the document R by the detection sensor 122 will next be described with reference to FIGS. 1 to 3. FIG. 3 is a schematic illustration of the detection sensor 122. The detection sensor 122 detects the skew angle of the document R.

Here, the detection sensor 122 includes a first detection sensor 122A and a second detection sensor 122B. Each of the first and second detection sensors 122A and 122B is for example an optical sensor. In the present embodiment, each of the first and second detection sensors 122A and 122B includes a light-emitting section and a light-receiving section. The document R reflects light emitted from the light-emitting section, and the reflected light enters the light-receiving section. This enables the light-receiving section to detect presence or absence of the document R by receiving the light reflected by the document R. The first detection sensor 122A detects an area of the document R on a left side of a center line of the document R, while the second detection sensor 122B detects an area of the document R on a right side of the center line.

Figure 3:
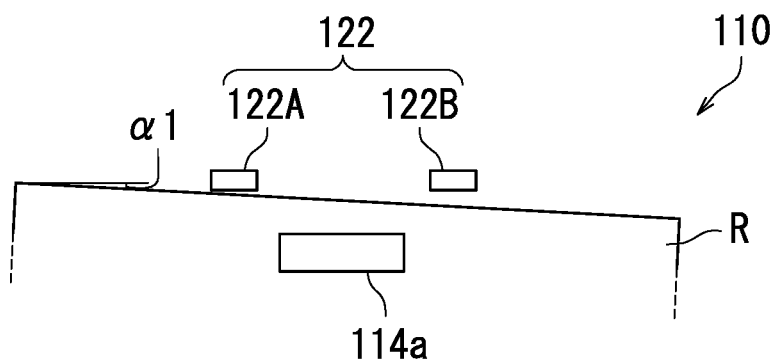
FIG. 3 is a schematic illustration of a reading unit in the image forming apparatus according to the present embodiment.

In FIG. 3, the document R is conveyed in the conveyance direction. Here, as illustrated in FIG. 3, the document R is conveyed with the document R skewed. Specifically, the document R is conveyed with a left side of the document R more forwardly inclined than a right side of the document R.

The first and second detection sensors 122A and 122B are aligned in a straight line perpendicular to the conveyance direction. If the document R is conveyed with the document R not skewed, the embodiment enables the first and second detection sensors 122A and 122B to detect the presence of the document R at the same time.

As illustrated in FIG. 3, in the case where the document R is conveyed with the left side of the document R more forwardly inclined than the right side of the document R, the first detection sensor 122A detects the presence of the document R earlier than the second detection sensor 122B, and the second detection sensor 122B subsequently detects the presence of the document R. Time at which the first detection sensor 122A detects the presence of the document R is represented by "t1" and time at which the second detection sensor 122B detects the presence of the document R is represented by "t2". A distance between the first and second detection sensors 122A and 122B is also represented by a distance D. An angle α1 is calculated based on "t2−t1" and the distance D. The calculated angle α1 is a skew angle detected from the document R.

Note that the first and second detection sensors 122A and 122B may detect an angle of a corresponding side of the document R in the conveyance direction of the document R. Typically, the document R has a main surface that is rectangular. Each side of the document R is parallel to the conveyance direction of the document R in the case where the document R is conveyed with the document R not skewed, whereas each side of the document R is inclined relative to the conveyance direction of the document R in the case where the document R is conveyed with the document R skewed. Thus, an angle of each side of the document R relative to the conveyance direction is equivalent to a skew angle. In this case, a skew angle of the document R may be detected by only one of the first and second detection sensors 122A and 122B.

Figure 4A:
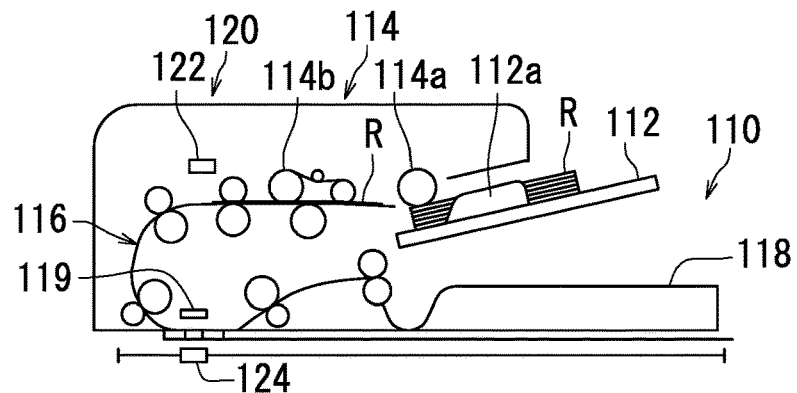
FIGS. 4A, 4B, 4C, and 4D are schematic illustrations depicting how the reading unit in the image forming apparatus according to the present embodiment detects conveyance and skew angles of a document.
Figure 4B:
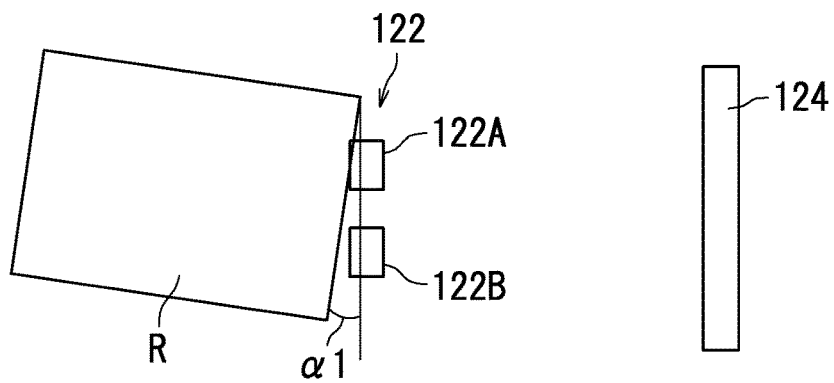
Figure 4C:
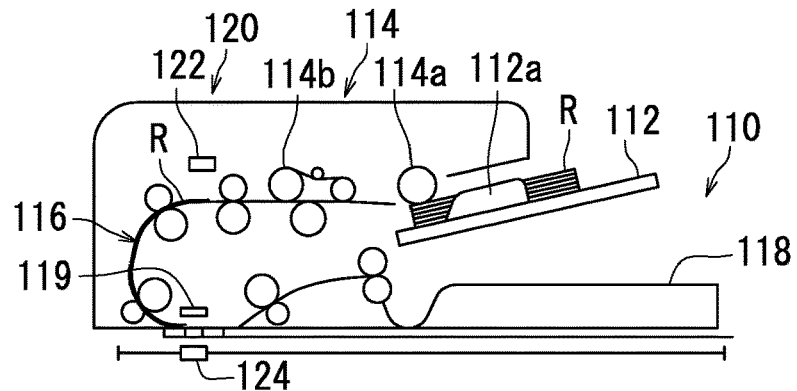
Figure 4D:
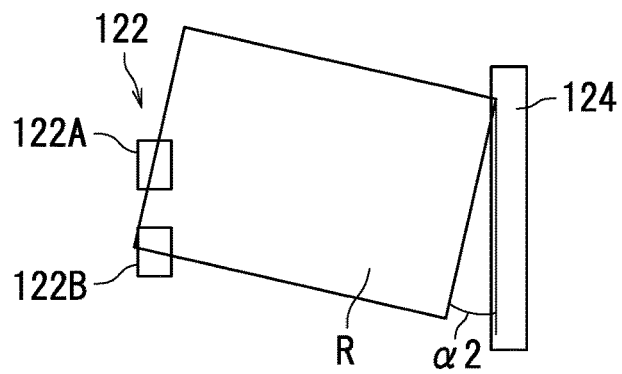

Detection of the conveyed document R by the reading unit 110 in the image forming apparatus 100 according to the present embodiment will next be described with reference to FIGS. 1 to 4D. FIGS. 4A to 4D are schematic illustrations depicting the detection of the conveyed document R by the reading unit 110 in the image forming apparatus 100 according to the present embodiment. FIG. 4A is a schematic illustration depicting the reading unit 110 when the document R conveyed by the conveyance section 116 reaches a detection area of the detection sensor 122. FIG. 4B is a schematic illustration depicting a skew angle of the document R in FIG. 4A. FIG. 4C is a schematic illustration depicting the reading unit 110 when the document R conveyed by the conveyance section 116 reaches a reading area of the reading sensor 124. FIG. 4D is a schematic illustration depicting a skew angle of the document R in FIG. 4C.

As illustrated in FIGS. 4A and 4B, the conveyance section 116 conveys the document R, thereby causing the document R to reach the detection area of the detection sensor 122. Here, the document R is conveyed with the document R skewed. Although the document R has reached a detection area of the first detection sensor 122A, the document R has not yet reached a detection area of the second detection sensor 122B. The conveyance section 116 subsequently further conveys the document R, thereby causing the document R to reach the detection area of the second detection sensor 122B. As a result, the second detection sensor 122B detects the presence of the document R. The detection sensor 122 consequently detects a first skew angle α1 of the document R.

The conveyance section 116 subsequently further conveys the document R, thereby causing the document R to reach the reading area of the reading sensor 124.

As illustrated in FIGS. 4C and 4D, when the conveyance section 116 conveys the document R to cause the document R to reach the reading area of the reading sensor 124, the reading sensor 124 reads an image of the document R. In addition, when the document R reaches the reading area of the reading sensor 124, the reading sensor 124 detects a second skew angle α2 of the document R. Here, the skew of the document R further increases (second skew angle α2>first skew angle α1).

The image forming apparatus 100 according to the present embodiment determines a conveyance process of the document R based on the first and second skew angles α1 and α2 of the document R. For example, in the case where a difference between the first and second skew angles α1 and α2 is relatively large, a degree of the skew of the document R further increases after the document R passes through the reading sensor 124. Therefore, even if values of the first and second skew angles α1 and α2 of the document R are relatively small, a jam may occur as a result of the document R colliding with a side wall of the conveyance path of the conveyance section 116. In this case, the image forming apparatus 100 stops conveyance of the document R based on the first and second skew angles α1 and α2 of the document R, thereby enabling avoidance of collision between the document R and both side walls of the conveyance path.

Note that the image adjuster 152c may correct the image data according to the skew angle. That is, a skew angle of the document R is the second skew angle α2 when the leading edge of the document R reaches the reading area of the reading sensor 124. The image adjuster 152c may therefore correct the image data generated by the reading sensor 124 so that an image represented by the image data is rotated by the second skew angle α2.

Alternatively, the image adjuster 152c may correct the image data by predicting a change in the skew angle of the document R. For example, in the case where the skew angle of the document R changes to the first skew angle α1 and the second skew angle α2, a skew angle of the document R after passing through the reading sensor 124 may further change even if a skew angle of the document R when reaching the reading area of the reading sensor 124 is the second skew angle α2. In this case, the image adjuster 152c may correct the image data by rotating the image represented by the image data according to a predicted skew angle that is predicted based on the first and second skew angles α1 and α2.

As described with reference to FIGS. 4C and 4D, the reading sensor 124 reads the image of the document R. At this moment, a light quantity emitted from the light source when the reading sensor 124 detects the skew angle of the document R may be larger than a light quantity emitted from the light source when the reading sensor 124 reads the image of the document R. Note that in the case where the skew angle of the document R detected by the reading sensor 124 exceeds a threshold, the reading sensor 124 may continue detecting a skew angle of the document R without reading the image of the document R to detect a skew angle of the document R in the proximity of a center thereof. In this case, the reading sensor 124 may keep the large light quantity while the document R is passing through the reading area of the reading sensor 124.

Figure 5:
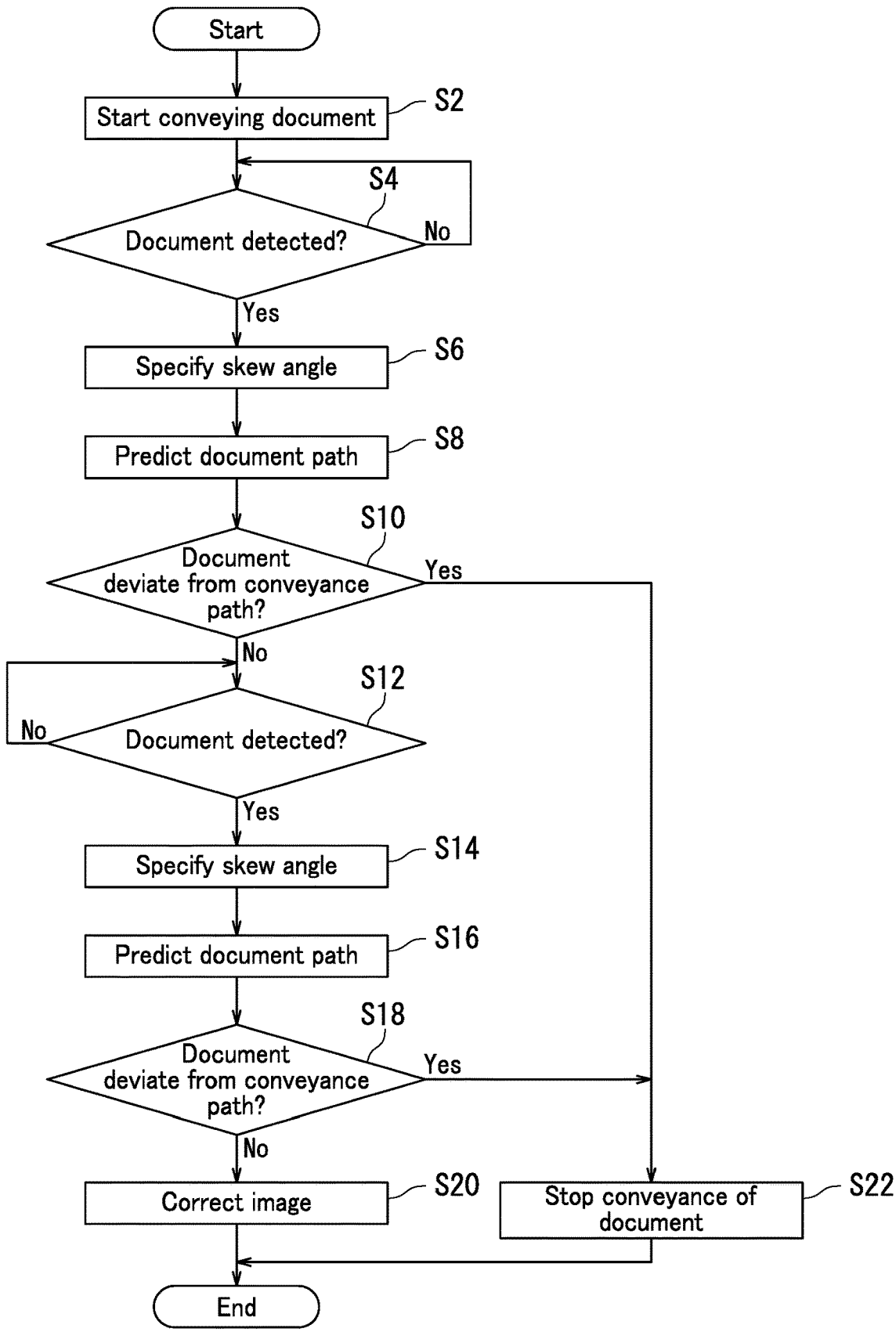
FIG. 5 is a flowchart of a control process in the image forming apparatus according to the present embodiment.

A control process of the image forming apparatus 100 will next be described with reference to FIGS. 1 to 5. FIG. 5 is a flowchart depicting an exemplary control process of the image forming apparatus 100.

At Step S2: conveyance of a document R is started. Specifically, the processing section 152 instructs the feeding section 114 and the conveyance section 116 to start conveyance of the document R. The process then proceeds to Step S4.

At Step S4: the detection sensor 122 determines whether or not to detect the presence of the document R. When it is determined that the detection sensor 122 detects the presence of the document R (Yes at Step S4), the process proceeds to Step S6. When it is determined that the detection sensor 122 detects the presence of the document R (No at Step S4), the process returns to Step S4.

At Step S6: the detection sensor 122 specifies a first skew angle of the document R. The process then proceeds to Step S8.

At Step S8: the determination section 152a predicts a path of the document R based on the first skew angle of the document R. The process then proceeds to Step S10.

At Step S10: the determination section 152a determines whether or not the document R will deviate from the conveyance path based on a prediction result at Step S8. When the determination section 152a determines that the document R will deviate from the conveyance path (Yes at Step S10), the process proceeds to Step S22. When the determination section 151a determines that the document R will not deviate from the conveyance path (No at Step S10), the process proceeds to Step S12.

At Step S12: the processing section 152 determines whether or not the reading sensor 124 has detected the presence of the document R. Here, the reading sensor 124 determines whether or not reading of reading the image of the document R has been started. When the processing section 152 determines that the reading sensor 124 has detected the presence of the document R (Yes at Step S12), the process proceeds to Step S14. When the processing section 152 determines that the reading sensor 124 has not detected the presence of the document R (No at Step S12), the process returns to Step S12.

At Step S14: the reading sensor 124 specifies a second skew angle of the document R. The process then proceeds to Step S16.

At Step S16: the determination section 152a predicts a path of the document R based on the second skew angle of the document R. Note that the determination section 152a may predict the path of the document R based on the first and second skew angles of the document R. The process then proceeds to Step S18.

At Step S18: the determination section 152a determines whether or not the document R will deviate from the conveyance path based on a prediction result at Step S16. When the determination section 152a determines that the document R will deviate from the conveyance path (Yes at Step S18), the process proceeds to Step S22. When the determination section 152a determines that the document R will not deviate from the conveyance path (No at Step S18), the process proceeds to Step S20.

At Step S20: the image adjuster 152c corrects image data generated by the reading sensor 124 reading an image of the document R. For example, the image adjuster 152c corrects the image data so that the read image is the horizontal image based on at least one of the first and second skew angles. The above conveyance process then ends.

At Step S22: the conveyance controller 152b stops conveyance of the document R.

It is possible to control conveyance of the document R by predicting the path of the document R according to a change in the skew angles of the document R in the present embodiment. For example, determining whether or not the document R will deviate from the conveyance path based on a change amount of the skew angles of the document R enables avoidance of collision between the document R and both the side walls of the conveyance path.

Note that although it is determined that conveyance of the document R be continued or stopped in the description with reference to FIG. 5, the present embodiment is not limited to this. The conveyance section 116 may be adjusted so that a locus of conveyance of the document R is corrected in the case where the document R may deviate from the conveyance path. Alternatively, the conveyance section 116 may be adjusted so that a locus of the document R is corrected in the case where the document R is conveyed with the document R shifted to a position outside the reading area of the reading sensor 124.

Note that although the detection sensor 122 and the reading sensor 124 detects one edge of the document R (for example leading edge) in the above description with reference to FIGS. 3 to 4D, the present embodiment is not limited to this. The detection sensor 122 and the reading sensor 124 may detect a trailing edge of the document R. Alternatively, the detection sensor 122 and the reading sensor 124 may detect both the edges of the document R.

Figure 6A:
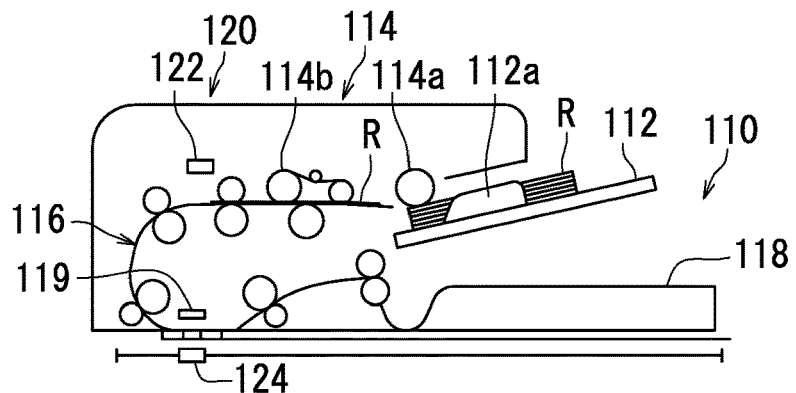
FIGS. 6A, 6B, 6C, and 6D are schematic illustrations depicting how the reading unit in the image forming apparatus according to the present embodiment detects conveyance and skew angles of the document.
Figure 6B:
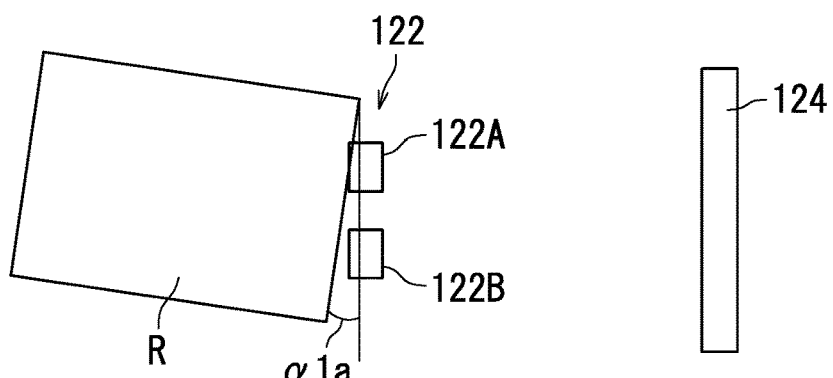
Figure 6C:
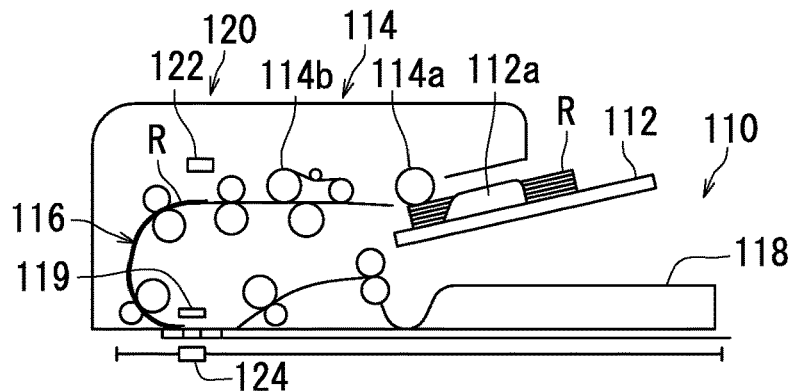
Figure 6D:
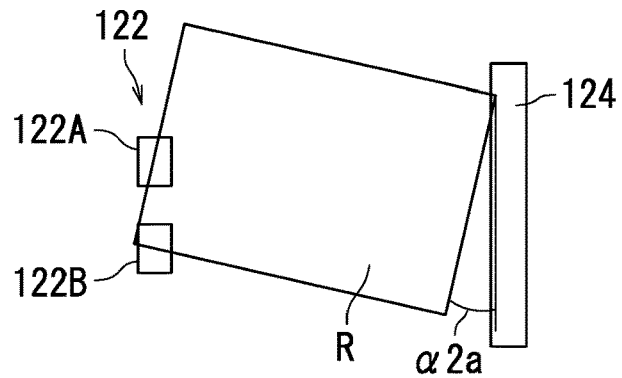
Figure 7A:
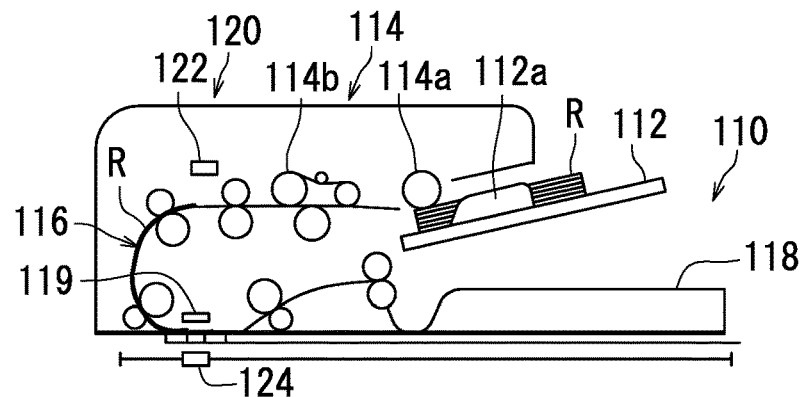
FIGS. 7A, 7B, 7C, and 7D are schematic illustrations depicting how the reading unit in the image forming apparatus according to the present embodiment detects conveyance and skew angles of the document.
Figure 7B:
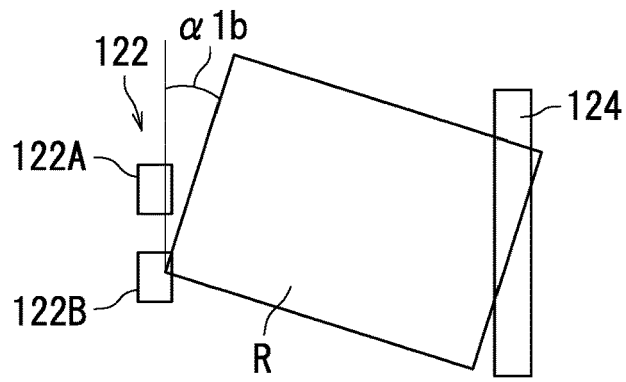
Figure 7C:
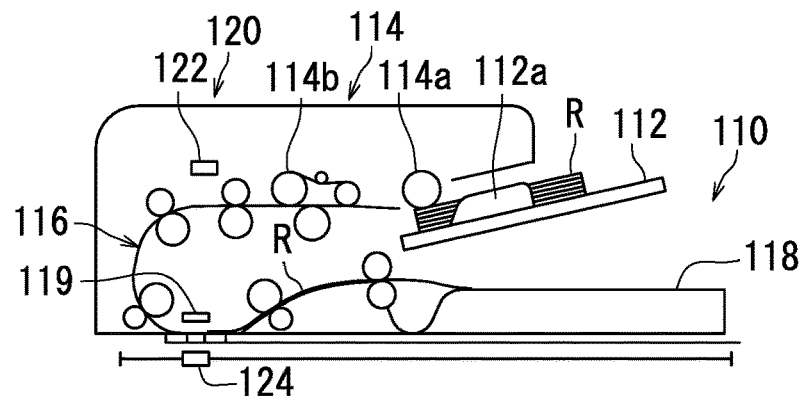
Figure 7D:
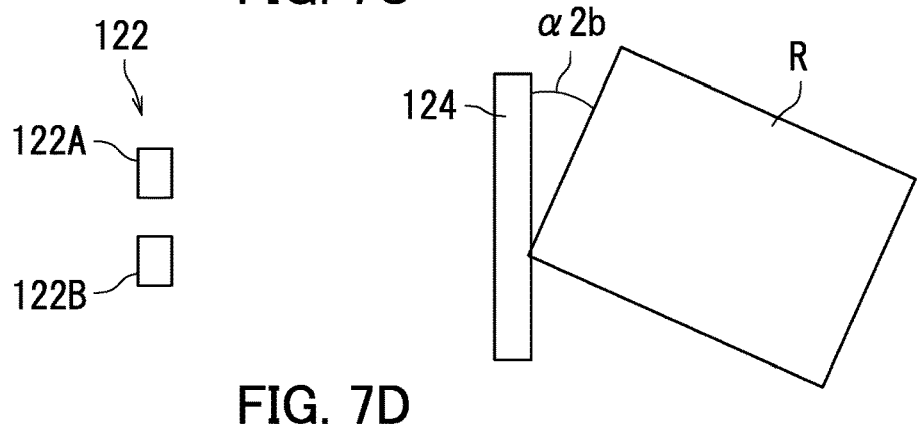

How the reading unit 10 in the image forming apparatus 100 according to the present embodiment detects the presence of the document R being conveyed will next be described with reference to FIGS. 1 to 3, 6A, 6B, 6C, 6D, 7A, 7B, 7C, and 7D. FIGS. 6A to 7D are schematic illustrations depicting how the reading unit 10 in the image forming apparatus 100 according to the present embodiment detects the document R being conveyed. FIG. 6A is a schematic illustration depicting the reading unit 110 when the leading edge of the document R reaches the detection area of the detection sensor 122. FIG. 6B is a schematic illustration depicting a skew angle of the document R in FIG. 6A. FIG. 6C is a schematic illustration depicting the reading unit 110 when the leading edge of the document R reaches the reading area of the reading sensor 124. FIG. 6D is a schematic illustration depicting a skew angle of the document R in FIG. 6C. FIG. 7A is a schematic illustration depicting the reading unit 110 when the trailing edge of the document R reaches the detection area of the detection sensor 122. FIG. 7B is a schematic illustration depicting a skew angle of the document R in FIG. 7A. FIG. 7C is a schematic illustration depicting the reading unit 110 when the trailing edge of the document R reaches the reading area of the reading sensor 124. FIG. 7D is a schematic illustration depicting a skew angle of the document R in FIG. 7C.

As illustrated in FIGS. 6A and 6B, the conveyance section 116 conveys the document R, thereby causing the leading edge of the document R to reach the detection area of the detection sensor 122. Here, the document R is conveyed with the document R skewed. The leading edge of the document R has reached the detection area of the first detection sensor 122A. However, the leading edge has not yet reached the detection area of the second detection sensor 122B. The conveyance section 116 subsequently further conveys the document R, thereby causing the leading edge of the document R to reach the detection area of the second detection sensor 122B. As a result, the presence of the document R is detected by the second detection sensor 122B. The detection sensor 122 consequently detects a first leading edge skew angle $\alpha 1a$ of the document R.

The conveyance section 116 subsequently further conveys the document R, thereby causing the leading edge of the document R to reach the reading area of the reading sensor 124.

As illustrated in FIGS. 6C and 6D, when the conveyance section 116 conveys the document R, the leading edge of the document R reaches the reading area of the reading sensor 124. Here, the trailing edge of the document R does not pass through the detection area of the detection sensor 122. The presence of the document R remains still detected by the detection sensor 122. Part of the leading edge of the document R reaches the reading area of the reading sensor 124, while another part of the leading edge of the document R does not reach the reading area of the reading sensor 124. As described above, the reading sensor 124 detects a second leading edge skew angle α2a of the document R.

The conveyance section 116 subsequently further conveys the document R, thereby causing the trailing edge of the document R to pass through the detection area of the detection sensor 122.

As illustrated in FIGS. 7A and 7B, the conveyance section 116 conveys the document R, thereby causing the trailing edge of the document R to move away from the detection area of the detection sensor 122. The trailing edge of the document R first moves away from the detection area of the first detection sensor 122A, and the presence of the document R is no longer detected by the first detection sensor 122A. However, the trailing edge of the document R is still detected in the detection area of the second detection sensor 122B. The conveyance section 116 subsequently further conveys the document R, thereby causing the trailing edge of the document R to move away from the detection area of the second detection sensor 122B. As a result, the presence of the document R is no longer detected by the second detection sensor 122B. The detection sensor 122 accordingly detects a first trailing edge skew angle α1b of the document R.

The conveyance section 116 subsequently further conveys the document R, thereby causing the document to pass through the reading area of the reading sensor 124. As a result, the reading sensor 124 finishes reading the document R.

As illustrated in FIGS. 7C and 7D, when the conveyance section 116 conveys the document R, the leading edge of the document R passes though the reading sensor 124. Part of the trailing edge of the document R passes through the reading area of the reading sensor 124, while other part of the trailing edge of the document R does not pass through the reading area of the reading sensor 124. In this case, the reading sensor 124 detects a second trailing edge skew angle α2b as well.

The image forming apparatus 100 according to the present embodiment determines the conveyance process of the document R based on any of the first leading edge skew angle α1a, the first trailing edge skew angle α1b, the second leading skew angle α2a, and the second trailing edge skew angle α2b of the document R. For example, even if values of the first leading edge skew angle α1a, the first trailing edge skew angle α1b, the second leading skew angle α2a, and the second trailing edge skew angle α2b are relatively small, the document R may further skew after passing through the reading sensor 124 in the case where a difference between the first trailing edge skew angle α1b and the second trailing edge skew angle α2b is relatively large. In this case, the image forming apparatus 100 stops conveyance of the document R based on the first and second trailing edge skew angles α1b and α2b, thereby enabling avoidance of collision between the document R and both the side walls of the conveyance path.

Note that the image adjuster 152c may correct the image data by changing an inclination for changing the read image according to an area in which a skew angle of the image of the document R is detected. For example, the image adjuster 152c changes the inclination for correcting the read image based on the second leading edge skew angle α2a to the first trailing edge skew angle α1b in respective areas of the document R corresponding to a period of time from the leading edge of the document R reaching the reading area of the reading sensor 124 to the trailing edge of the document R moving away from the detection area of the detection sensor 122 (namely, a period of time from FIG. 6D to FIG. 7B). It is preferable that the inclination smoothly change in a range of the second leading edge skew angle α2a to the first trailing edge skew angle α1b according to the respective areas of the document R.

In addition, the image adjuster 152c changes the inclination for correcting the read image based on the first trailing edge skew angle α1b to second trailing edge skew angle α2b in an area of the document R corresponding to a period of time from the trailing edge of the document R leaving the detection area of the detection sensor 122 to the trailing edge of the document R leaving the reading area of the reading sensor 124 (that is, a period of time from FIG. 7B to FIG. 7D). It is preferable that the inclination smoothly change in a range of the first trailing edge skew angle α1b to the second trailing edge skew angle α2b according to the areas of the document R.

Note that although the skew angle of the document R changes in one direction according to the conveyance distance of the document R in the above description, the present embodiment is not limited to this. In the conveyance of the document R, the document R may be conveyed in a meandering manner. In this case, the skew angle of the document R changes in a meandering manner according to the conveyance distance of the document R.

A control method of the image forming apparatus 100 when the document R meanders will next be described with reference to FIGS. 8A, 8B, 8C, and 8D. FIGS. 8A to 8D illustrate the meandering of the document R conveyed in the reading unit 110 in the present embodiment. FIGS. 8A to 8D illustrate a state in which the document R is conveyed while meandering by the conveyance section 116.

Figure 8A:
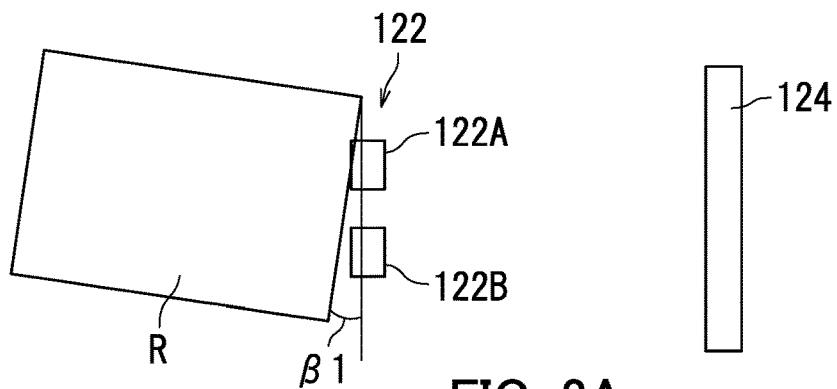
FIGS. 8A, 8B, 8C, and 8D are schematic illustrations depicting how the reading unit in the image forming apparatus according to the present embodiment detects meandering and skew angles of the document.

As illustrated in FIG. 8A, a leading edge skew angle of the document R detected by the detection sensor 122 is β1. Here, 0<β1 where the skew angle in the case where the left side of the leading edge of the document R advances in the conveyance direction is positive.

Figure 8B:
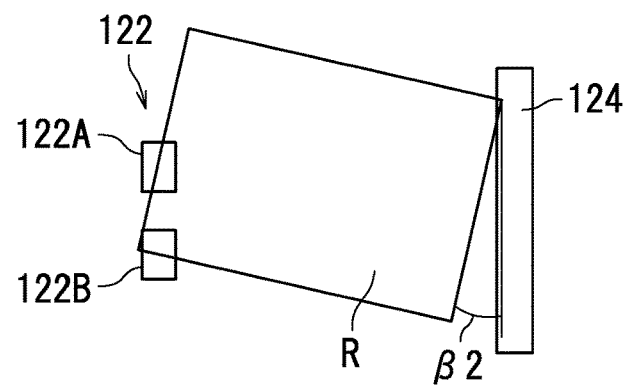

As illustrated in FIG. 8B, when the document R is conveyed while rotating counterclockwise, the reading sensor 124 detects a skew angle of the document R. A leading edge skew angle of the document R detected by the reading sensor 124 is β2. Here, 0<β2<β1.

Figure 8C:
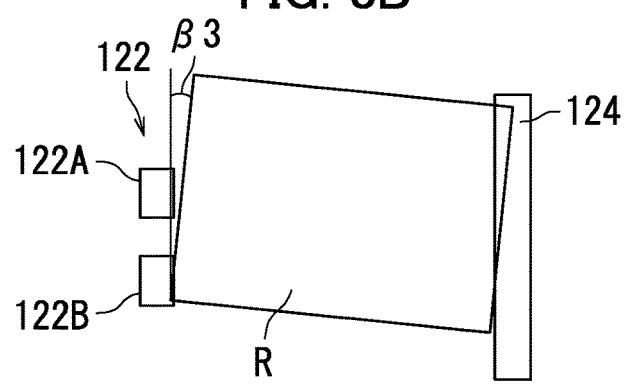

As illustrated in FIG. 8C, when the document R is conveyed while rotating counterclockwise, the detection sensor 122 detects a skew angle of the document R. A trailing edge skew angle of the document R detected by the detection sensor 122 is β3. Here, 0<β3<β2.

Figure 8D:
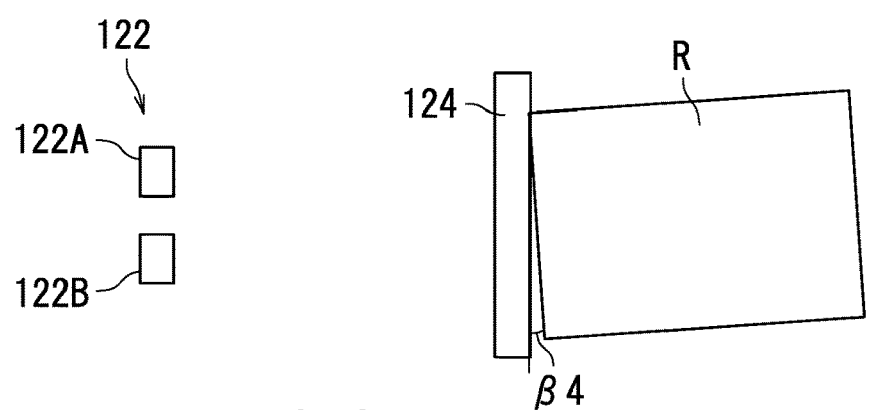

As illustrated in FIG. 8D, when the document R is conveyed while rotating counterclockwise, the reading sensor 124 detects a skew angle of the document R. A trailing edge skew angle of the document R detected by the reading sensor 124 is β4. Here, β4<0<β3.

In the image forming apparatus 100 according to the present embodiment, respective skew angles of the leading and trailing edges of the document R are detected by the detection sensor 122 and the reading sensor 124. It is therefore possible to detect the meandering of the document R whose skew angle to be detected increases and decreases in a repetitive manner with time. In the case where the document meanders, the conveyance of the document R need not be stopped if the skew angle is not excessively large.

Note that although the detection section 120 of the reading unit 110 includes the detection sensor 122 that detects presence or absence of the document R and the reading sensor 121 that reads an image of the front side of the document R in the above description with reference to FIGS. 1 to 8D, the present embodiment is not limited to this. The detection section 120 may include an additional reading sensor. As the reading sensor in this case, a sensor reading an image of a rear side of the document is preferably added.

Figure 9:
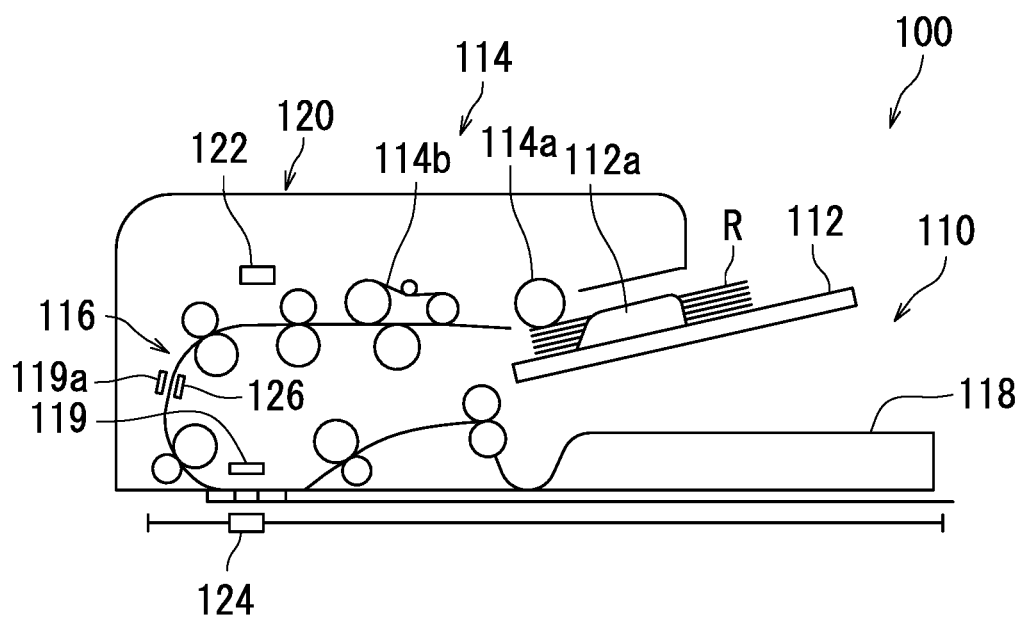
FIG. 9 is a schematic illustration of the reading unit in the image forming apparatus according to the schematic illustration.

A structure of the reading unit 110 in the image forming apparatus 100 according to the present embodiment will hereinafter be described with reference to FIGS. 9 and 10. FIG. 9 is a schematic illustration of the reading unit 110 in the present embodiment. The reading unit 110 in FIG. 9 has a structure similar to that of the reading unit 110 described above with reference to FIG. 4 except that the detection section 120 of the reading unit 110 in FIG. 9 further includes a reading sensor 126 and that the conveyance section 116 in FIG. 9 further includes a facing member 119a. Duplicate descriptions are omitted to avoid redundancy.

In the image forming apparatus 100 according to the present embodiment, the reading unit 110 conveys the document R. The reading unit 110 is for example an ADF.

The detection section 120 includes the reading sensor 126 in addition to the detection sensor 122 and the reading sensor 124. As stated above, the reading sensor 124 reads an image of the front side of the document R and generates image data represent the image of the front side. Typically, the reading sensor 126 is a reflective sensor.

The reading sensor 126 reads an image of a rear side of the document R and generates image data representing the image of the rear side. In addition, the reading sensor 126 detects a skew angle of the document R based on the read image. Note that the reading sensor 126 corresponds to an example of a "third detector". Further, the reading sensor 126 detects a third skew angle of the document R.

The reading sensor 126 may be located between the detection sensor 122 and the reading sensor 124, or located downstream of the reading sensor 124. In the embodiment illustrated in FIG. 9, the reading sensor 126 is located between the detection sensor 122 and the reading sensor 124. In the present specification, in the case where the reading sensor 126 detects a skew angle of the document R, the detected skew angle may be referred to as a "third skew angle".

Note that preferably the reading unit 110 further includes the facing member 119a. The facing member 119s is located facing the reading sensor 126. The facing member 119a supports detection of the third skew angle when the reading sensor 126 reads the image of the document R. Specifically, the facing member 119a is a plate that is rectangular and has a high contrast to the color of the Document R. The facing member 119a supports detection of the third skew angle when the reading sensor 126R reads the image of the document R. In the present embodiment, color of the facing member 119a is set so that a contrast between the color of the document R and the color of the facing member 119a is higher than a predefined threshold.

The structure of the image forming apparatus 100 will next be described with reference to FIGS. 9 and 10. FIG. 10 is a structural block diagram of the image forming apparatus 100. The embodiment of the block diagram in FIG. 9 has the structure similar to that depicted by the block diagram in FIG. 2 except that the detection section 120 in FIG. 9 further includes the reading sensor 126. Duplicate descriptions are omitted to avoid redundancy.

Figure 10:
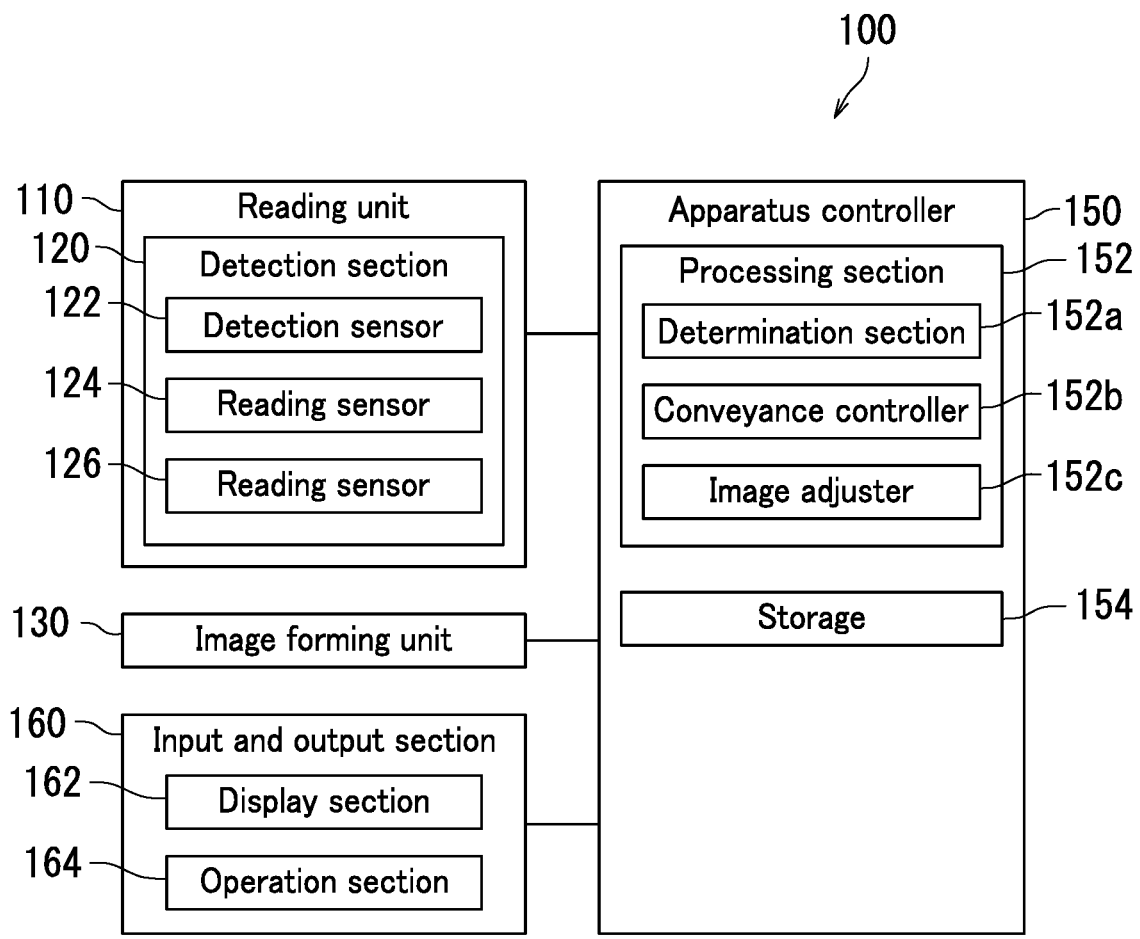
FIG. 10 is a block diagram of the image forming apparatus according to the present embodiment.

As illustrated in FIG. 10, the detection section 120 includes the reading sensor 126 in addition to the detection sensor 122 and the reading sensor 124.

The determination section 152a may determine whether or not to stop conveyance of the document R based on a change amount of the document R relative to a perpendicular direction (conveyance perpendicular direction) to the conveyance direction of the document R. Specifically, it may be determined that the conveyance of the document R be stopped when a change amount is greater than a preset threshold. Here, the change amount is a change amount of the document R relative to the conveyance perpendicular direction and detected by at least one of the reading sensors 124 and 126.

For example, in the case where each of the reading sensors 124 and 12 reads an image of the document R, a difference between a center position of an image in the conveyance perpendicular direction read by the reading sensor 124 and a center position of an image in the conveyance perpendicular direction read by the reading sensor 126 is calculated. It may be determined that the conveyance of the document R be stopped when the calculated difference is larger than a prescribed threshold.

In addition, the determination section 152a determines to stop conveyance of the document R when the document R will deviate from the conveyance width of the conveyance section 116 due to the conveyance of the document R. Specifically, it is determined that the conveyance of the document R be stopped when a change amount is greater than prescribed conveyance width. Here, the change amount is a change amount of the document R relative to the conveyance perpendicular direction and detected by at least one of the reading sensors 124 and 126. The determination as to whether or not the change amount of the document R relative to the conveyance perpendicular direction is larger than the prescribed conveyance width may be made by a method similar to the determination about whether or not the change amount of the document R relative to the conveyance perpendicular direction is larger than the prescribed threshold.

In addition, based on the first, second, and third skew angles, the determination section 152a determines whether or not the document R is conveyed while meandering and whether or not to stop conveyance of the document R.

The conveyance controller 152b controls respective operations of the feeding section 114 and the conveyance section 116 according to an instruction of the processing section 152. The conveyance controller 152b controls for example a stepper motor based on control pulses transmitted from the processing section 152. Here the stepper motor drives rollers and the like of the feeding section 114 and the conveyance section 116.

As described above with reference to FIGS. 1 to 10, the image forming apparatus 100 according to the present embodiment determines whether or not the document R will deviate from the conveyance width based on the skew angles detected by the sensors and/or a change amount of the document R relative to the conveyance perpendicular direction while the document R is being conveyed by the conveyance section 116. The image forming apparatus 100 further determines whether or not the document R will deviate from the conveyance width according to a meandering state of the document R while the document R is being conveyed by the conveyance section 116. Here, the meandering state is defined based on the skew angles detected by the sensors and/or the movement amount relative to the conveyance perpendicular direction. It is therefore possible to cope with a case where the skew angles of a document or the like change during the conveyance of the document or the like.

The detection section 120 includes the detection sensor 122 and the reading sensor 124 as described above with reference to FIGS. 1 to 8D, while the detection section 120 includes the detection sensor 122, the reading sensor 124, and the reading sensor 126 as described above with reference to FIGS. 9 and 10. However, the present embodiment is not limited thereto. The detection section 120 may include the reading sensor 124 and the reading sensor 126 without including the detection sensor 122.

Furthermore, it is preferable that the conveyance section 116 include registration rollers that stop the conveyance of the document R when it is predicted that the document R fed by the feeding section 114 will deviate from the conveyance path.

Figure 11:
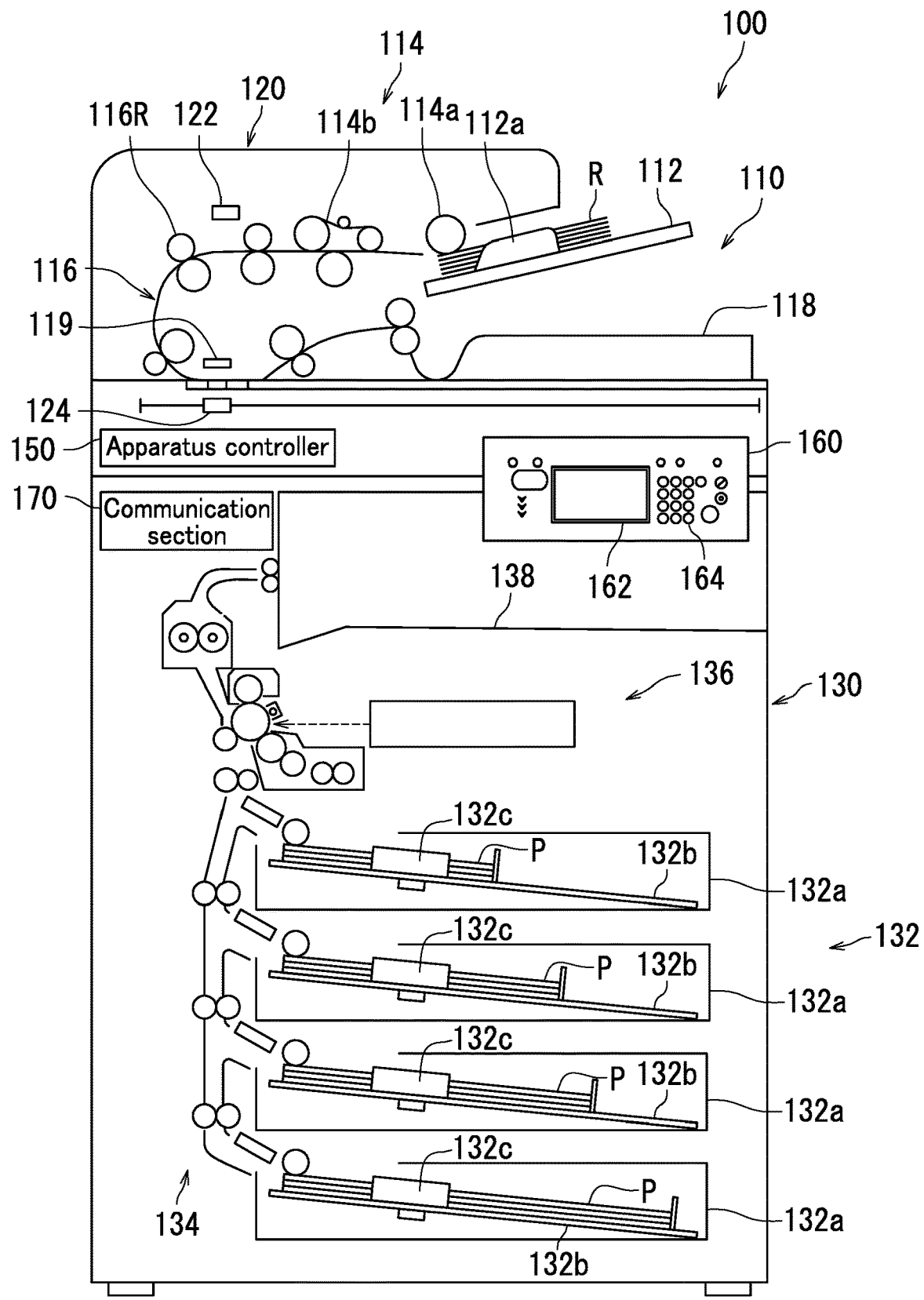
FIG. 11 is a schematic illustration of the image forming apparatus according to the present embodiment.

FIG. 11 is a schematic illustration of the image forming apparatus 100 according to the present embodiment. The image forming apparatus 100 in FIG. 11 has a structure similar to that of the image forming apparatus 100 described above with reference to FIG. 1 except that the conveyance section 116 in FIG. 11 includes registration rollers 116R. Duplicate descriptions are omitted to avoid redundancy.

The conveyance section 116 includes the registration rollers 116R. In the conveyance section 116, the registration rollers 116R are located downstream of the detection sensor 122. The registration rollers 116R warp the document R. Specifically, the registration rollers 116R temporarily stop the conveyance of the document R supplied to the conveyance path. The registration rollers 116R then warp the document R. Thus, the registration rollers 116R corrects the skew of the document R relative to the conveyance direction. The registration rollers 116R do not rotate when the leading edge of the document R reaches the registration rollers 116R. The registration rollers 116R start rotating when the leading edge of the document R reaches the registration rollers 116R.

Note that in the case where the reading unit 110 includes the registration rollers 116R, the conveyance controller 152b may control the operation of the registration rollers 116R according to an instruction of the processing section 152. For example, based on the skew angle detected by the detection sensor 122, the registration rollers 116R may stop or not stop the conveyance of the document R. For example, when the skew angle does not exceed a threshold, the registration rollers 116R need not stop the conveyance of the document R. In contrast, when the skew angle exceeds the threshold, the registration rollers 116R may stop the conveyance of the document R.

In the image forming apparatus 100 according to the present embodiment as stated above, it is determined whether or not the document R will deviate from the conveyance width based on the skew angles detected by the detectors and/or a movement amount in the conveyance perpendicular direction while the document R is being conveyed by the conveyance section 116. Further, the embodiment enables the registration rollers 116R to temporarily stop the conveyance of the document R to correct the skew of the document R when it is determined that the document R will deviate from the conveyance width.

As above, the embodiment of the present invention has been described with reference to the drawings (FIGS. 1 to 11). However, the present disclosure is not limited to the above-described embodiment and can be practiced in various ways within the scope without departing from the essence of the present disclosure (for example (1) to (3) below). Constituent elements disclosed in the above embodiment can be combined as appropriate in various different forms. For example, some constituent elements may be omitted from all of the constituent elements described in the embodiment. Further, constituent elements described in different examples of the embodiments may be combined as appropriate. The drawings mainly illustrate schematic constituent elements in order to facilitate understanding of the disclosure, and thickness, length, numbers, intervals or the like of each constituent element illustrated in the drawings may differ from actual ones thereof in order to facilitate preparation of the drawings. Further, the material, shape, or dimensions of each constituent element or the like described in the above embodiment are merely examples that do not impose any particular limitations and may be altered in various ways as long as such alterations do not substantially deviate from the effects of the present disclosure.

(1) Although the reading unit 110 is provided with the detection sensor 122, the reading sensor 124, and the reading sensor 126 and malfunction of the conveyance of the document R is prevented in the above description, the present embodiment is not limited to this. The conveyance section 134 of the image forming unit 130 may be provided with detection sensor 122, the reading sensor 124, and the reading sensor 126. Accordingly, the malfunction of the conveyance of the paper P may be prevented in the image forming unit 130.

(2) The embodiment of the present disclosure is not limited to the multifunction peripheral. For example, in the embodiment of the present disclosure, the reading unit 224 may be realized as an image reading device (scanner). In addition, the image forming apparatus may be a copier, a printer, a facsimile machine, a scanner, or a device having some of their respective functions.

(3) The present disclosure may be implemented as an image forming method including, as steps, characteristic configuration section of the image forming apparatus according to an aspect of the present disclosure, or implemented as a control program including the steps. The program may be distributed via a non-transitory computer-readable medium such as a CD-ROM or a transmission medium such as a communication network.

What is claimed is:

1. An image forming apparatus comprising:
   a conveyance section configured to convey a sheet along a conveyance path;
   a first detector configured to detect a first skew angle of the sheet conveyed by the conveyance section;
   a second detector that is located downstream of the first detector in the conveyance path and that is configured to detect a second skew angle of the sheet; and
   a determination section configured to determine whether or not to stop conveyance of the sheet based on the first skew angle and the second skew angle, wherein
   the determination section determines whether or not to cause the conveyance section to stop conveyance of the sheet based on a change amount of the second skew angle relative to the first skew angle.

2. The image forming apparatus according to claim 1, further comprising
   a third detector configured to detect a third skew angle of the sheet.

3. The image forming apparatus according to claim 2, wherein
a conveyance width is defined in the conveyance section, the conveyance width being a width that allows the sheet to be conveyed in a perpendicular direction to a conveyance direction, and
the determination section determines to stop conveyance of the sheet when it is predicted that the sheet will deviate from the conveyance width due to conveyance of the sheet.

4. The image forming apparatus according to claim 3, wherein
based on the first skew angle, the second skew angle, and the third skew angle, the determination section determines whether or not the sheet is conveyed while meandering, and whether or not to stop conveyance of the sheet.

5. The image forming apparatus according to claim 2, wherein
each of the second and third detectors includes a contact image sensor including a light source and a photo detector,
the second detector reads a first image of a first side of the sheet to generate first image data in addition to detection of the second angle,
the third detector reads a second image of a second side of the sheet to generate second image data in addition to detection of the third skew angle,
the image forming apparatus further includes an adjuster configured to correct one or both of the first image data and the second image data,
based on at least the second and third skew angles, the determination section determines whether or not to stop conveyance of the sheet or whether or not to correct the first image data and the second image data, and
when it is determined that the first image data and the second image data be corrected, the adjuster corrects the first image data and the second image data.

6. The image forming apparatus according to claim 5, wherein
the contact image sensor of each of the second and third detectors is set so that a light quantity emitted from a corresponding light source when a corresponding one of the second and third skew angles is detected differs from a light quantity emitted from the corresponding light source when a corresponding image of the sheet is read.

7. The image forming apparatus according to claim 2, further comprising
a facing member that faces at least one of the second and third detectors, wherein
a contrast between color of the sheet and color of the facing member is higher than a predefined threshold.

8. The image forming apparatus according to claim 1, wherein
when a difference between the first skew angle and the second skew angel is larger than a prescribed threshold, the determination section determines to cause the conveyance section to stop conveyance of the sheet.

9. An image reading device comprising:
a conveyance section configured to convey a sheet along a conveyance path;
a first detector configured to detect a first skew angle of the sheet conveyed by the conveyance section;
a second detector that is located downstream of the first detector in the conveyance path and that is configured to detect a second skew angle of the sheet; and
a determination section configured to determine whether or not to stop conveyance of the sheet based on the first skew angle and the second skew angle, wherein
the determination section determines whether or not to cause the conveyance section to stop conveyance of the sheet based on a change amount of the second skew angle relative to the first skew angle.

10. The image reading device according to claim 9, further comprising
a third detector configured to detect a third skew angle of the sheet.

11. The image reading device according to claim 10, wherein
a conveyance width is defined in the conveyance section, the conveyance width being a width that allows the sheet to be conveyed in a perpendicular direction to a conveyance direction, and
the determination section determines to stop conveyance of the sheet when it is predicted that the sheet will deviate from the conveyance width due to conveyance of the sheet.

12. The image reading device according to claim 11, wherein
based on the first skew angle, the second skew angle, and the third skew angle, the determination section determines whether or not the sheet is conveyed while meandering, and whether or not to stop conveyance of the sheet.

13. The image reading device according to claim 10, wherein
each of the second and third detectors includes a contact image sensor including a light source and a photo detector,
the second detector reads a first image of a first side of the sheet to generate first image data in addition to detection of the second skew angle,
the third detector reads a second image of a second side of the sheet to generate second image data in addition to detection of the third skew angle,
the image reading device further includes an adjuster configured to correct one or both of the first image data and the second image data,
based on at least the second and third skew angles, the determination section determines whether or not to stop conveyance of the sheet or whether or not to correct the first image data and the second image data, and
when it is determined that the first image data and the second image data be corrected, the adjuster corrects the first image data and the second image data.

14. The image reading device according to claim 13, wherein
the contact image sensor of each of the second and third detectors is set so that a light quantity emitted from a corresponding light source when a corresponding one of the second and third skew angles is detected differs from a light quantity emitted from the corresponding light source when a corresponding image of the sheet is read.

15. The image reading device according to claim 10, further comprising
a facing member that faces at least one of the second and third detectors, wherein
a contrast between color of the sheet and color of the facing member is higher than a predefined threshold.

16. The image reading device according to claim 9, wherein when a difference between the first skew angle and the second skew angel is larger than a prescribed threshold, the determination section determines to cause the conveyance section to stop conveyance of the sheet.

* * * * *